US005819928A

United States Patent [19]
Wynalda, Jr.

[11] Patent Number: 5,819,928
[45] Date of Patent: Oct. 13, 1998

[54] PACKAGING CONTAINER FOR RECORDINGS AND THE LIKE

[75] Inventor: Robert M. Wynalda, Jr., Comstock Park, Mich.

[73] Assignee: Wynalda Litho, Inc., Rockford, Mich.

[21] Appl. No.: 811,475

[22] Filed: Mar. 4, 1997

Related U.S. Application Data

[60] Provisional application No. 60/015,909, Apr. 22, 1996.

[51] Int. Cl.$^6$ .................................................. B65D 85/57
[52] U.S. Cl. ........................ 206/308.1; 206/309; 206/1.5
[58] Field of Search ................................ 206/1.5, 308.1, 206/309, 387.12, 534.2

[56] References Cited

U.S. PATENT DOCUMENTS

| | | |
|---|---|---|
| 2,866,541 | 12/1958 | Ravis . |
| 3,288,543 | 11/1966 | Sugerman . |
| 3,990,574 | 11/1976 | Roccaforte . |
| 3,998,324 | 12/1976 | Roccaforte . |
| 4,189,087 | 2/1980 | Dlugopolski . |
| 4,453,631 | 6/1984 | Mark . |
| 4,488,644 | 12/1984 | Wynalda . |
| 4,520,470 | 5/1985 | d'Alayer de Costemore d'Arc . |
| 4,561,544 | 12/1985 | Reeve ........................................ 206/1.5 |
| 4,771,883 | 9/1988 | Herr et al. . |
| 4,925,023 | 5/1990 | Goldblatt et al. . |
| 5,000,316 | 3/1991 | Lerner . |
| 5,088,599 | 2/1992 | Mahler . |
| 5,275,291 | 1/1994 | Sledge ....................................... 206/1.5 |
| 5,291,990 | 3/1994 | Sejzer .................................... 206/308.1 |
| 5,360,107 | 11/1994 | Chasin et al. ......................... 206/308.1 |
| 5,379,890 | 1/1995 | Mahler . |
| 5,709,300 | 1/1998 | Bolognia et al. .................... 206/308.1 |

FOREIGN PATENT DOCUMENTS

| | | |
|---|---|---|
| 0904804 | 7/1972 | Canada . |
| 0021009 | 12/1907 | United Kingdom . |
| 2079726 | 1/1982 | United Kingdom . |
| WO 92/22903 | 12/1992 | WIPO ............................... 206/308.1 |

*Primary Examiner*—David T. Fidei
*Attorney, Agent, or Firm*—Price, Heneveld, Cooper, DeWitt & Litton

[57] ABSTRACT

A package for releasably storing products such as compact discs comprising a base portion constructed from a single lightweight readily disposable blank of material and a disc holder made from a lightweight material such as plastic. The system maintains positive self-retention of the disc holder within the base portion by incorporating apertures in the flaps which engage bosses near the front of the disc holder when the disc holder is fully inserted into the base. As a result, the system prevents inadvertent outward movement of the disc holder due to gravity, random jostling, etc. The system also precludes complete removal of the disc holder from the base by including a widthwise flap which is contiguous with the lower major panel of the base and which is adapted to engage a shoulder on the underside of the disc holder. When the disc holder is withdrawn from the base a predetermined distance (fully exposing the product), it will engage the lower flap of the base to ensure that the disc holder does not separate from the base portion. The disc holder itself contains a recessed portion with a center hub for holding a compact disc or similar product, grooves surrounding the recessed portion for ready withdrawal of the compact disc and a finger recess for easy withdrawal of the disc holder from the base portion. In an alternate embodiment, a double product configuration contains two such package devices made from a single-blank of material and connected by a contiguous hinged portion which allows the base portions to close in book-like fashion.

17 Claims, 9 Drawing Sheets

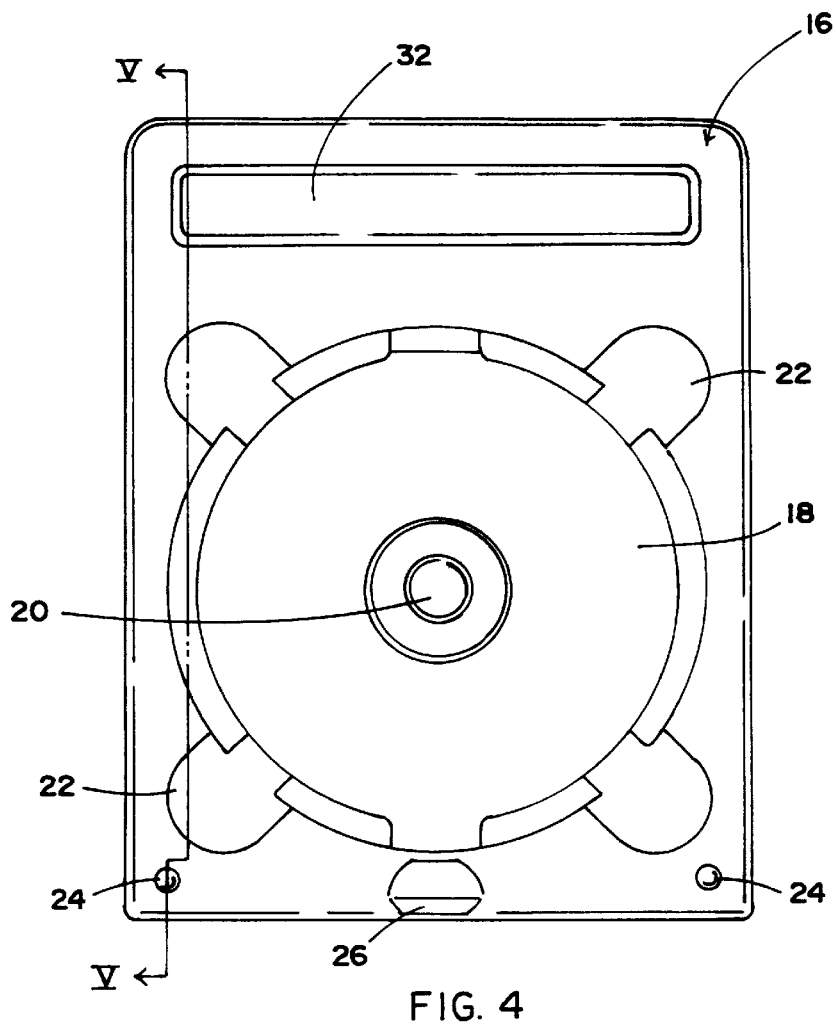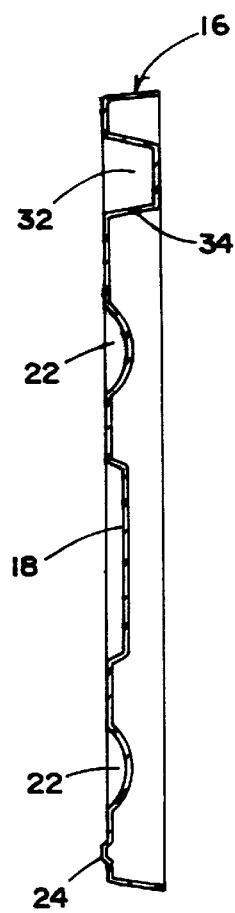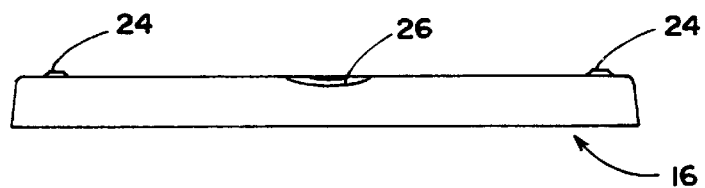
FIG. 4
FIG. 5
FIG. 7

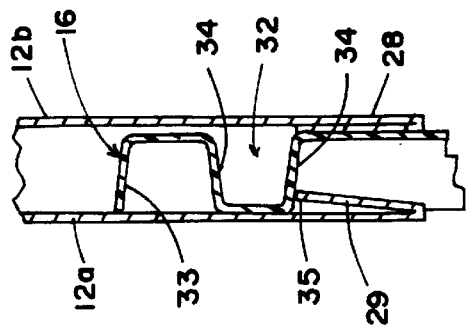
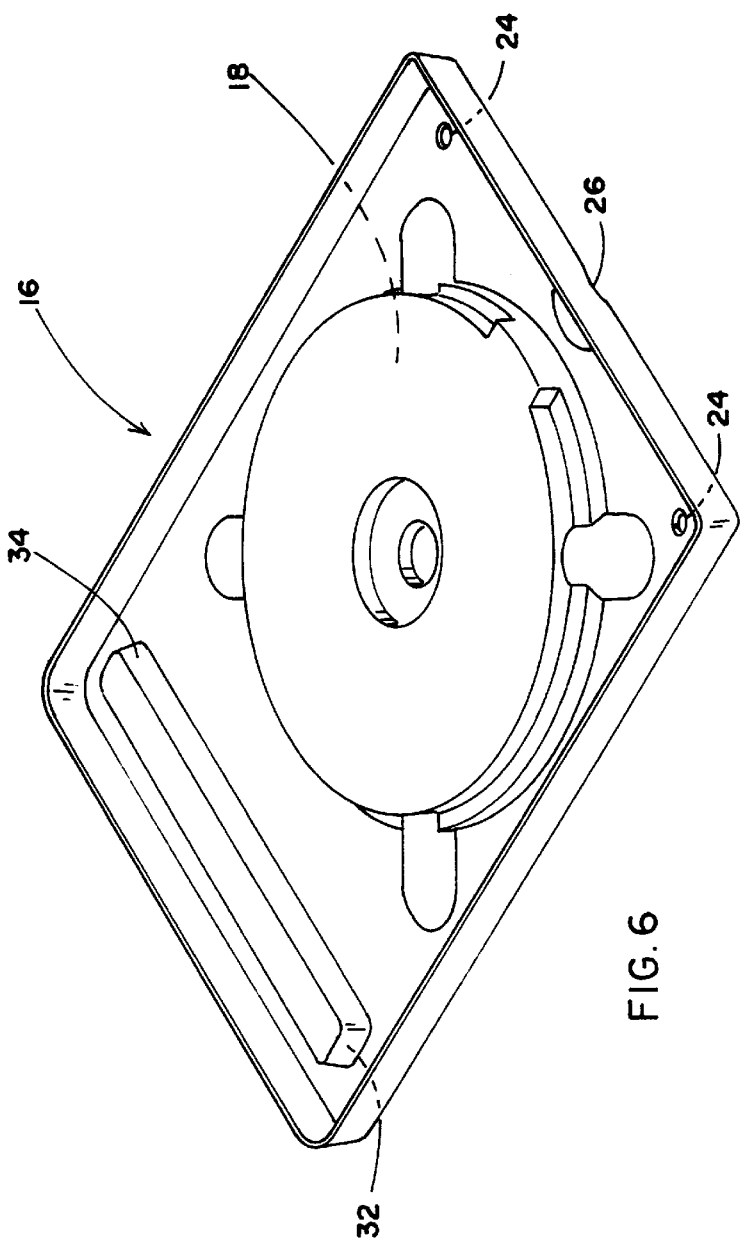
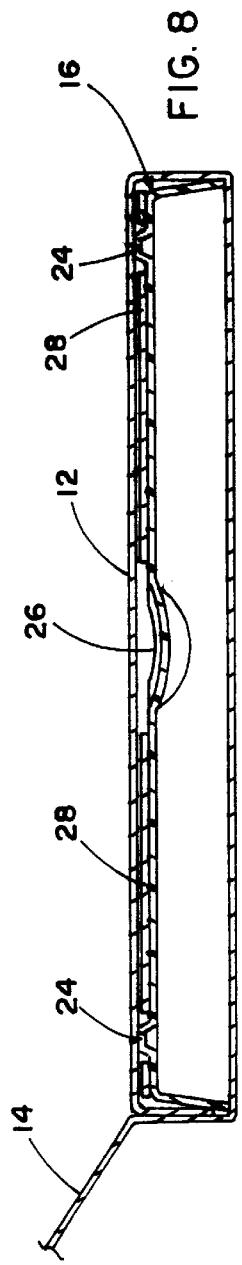

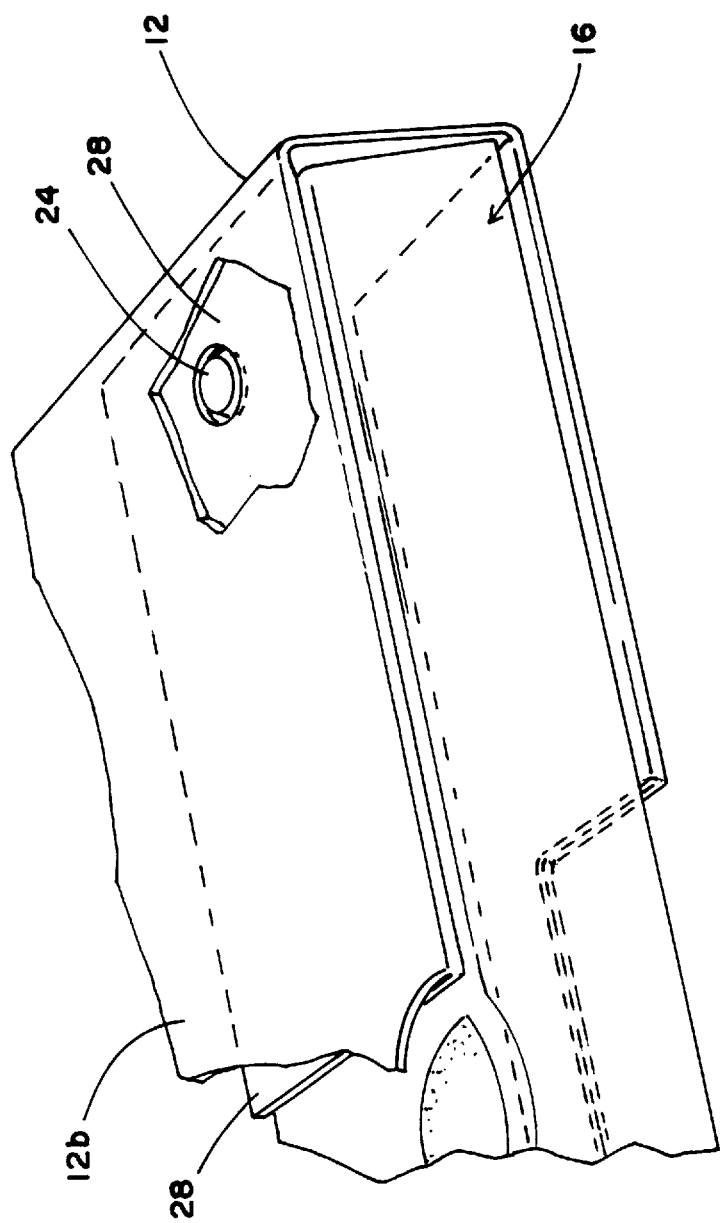

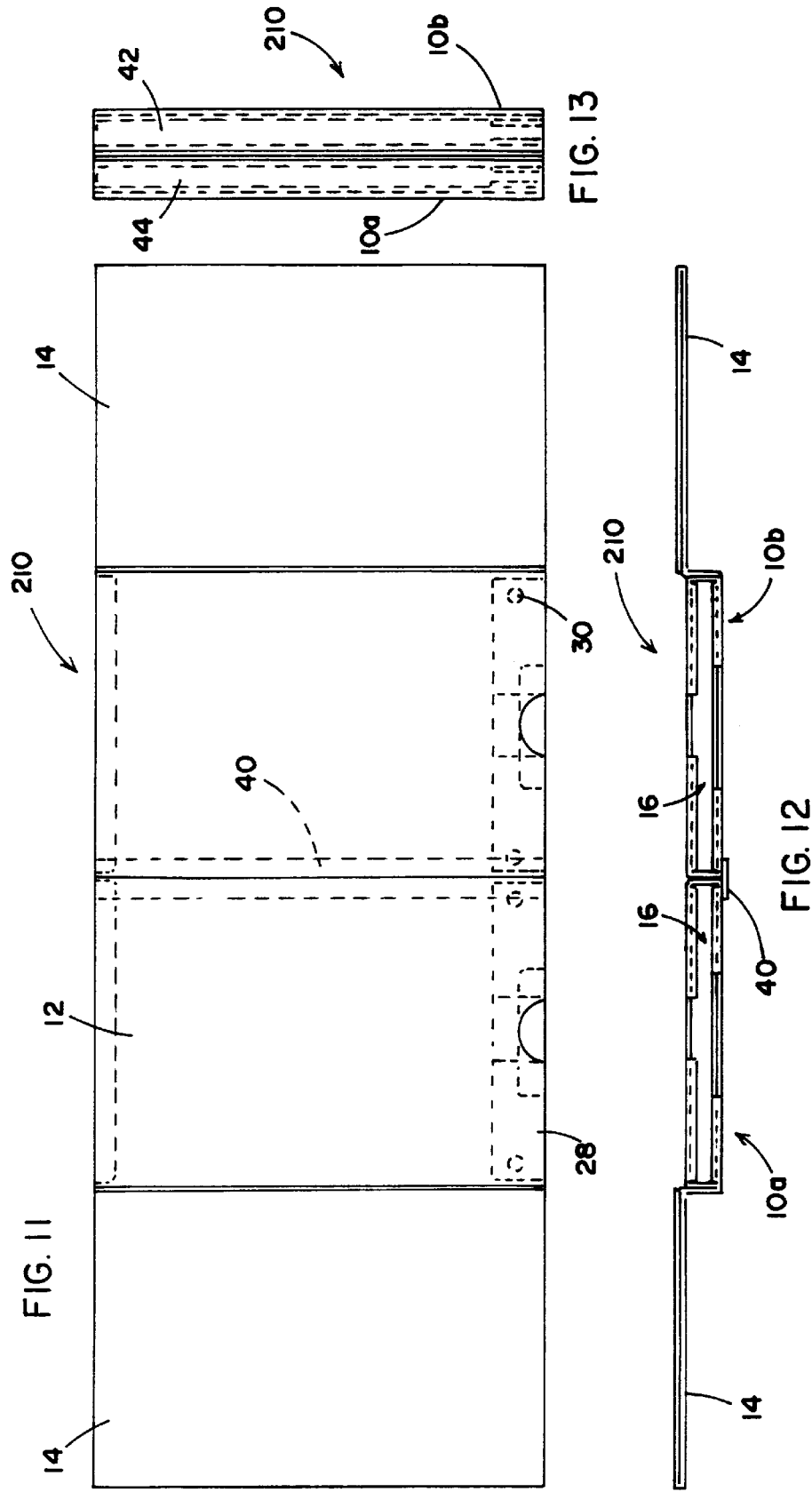

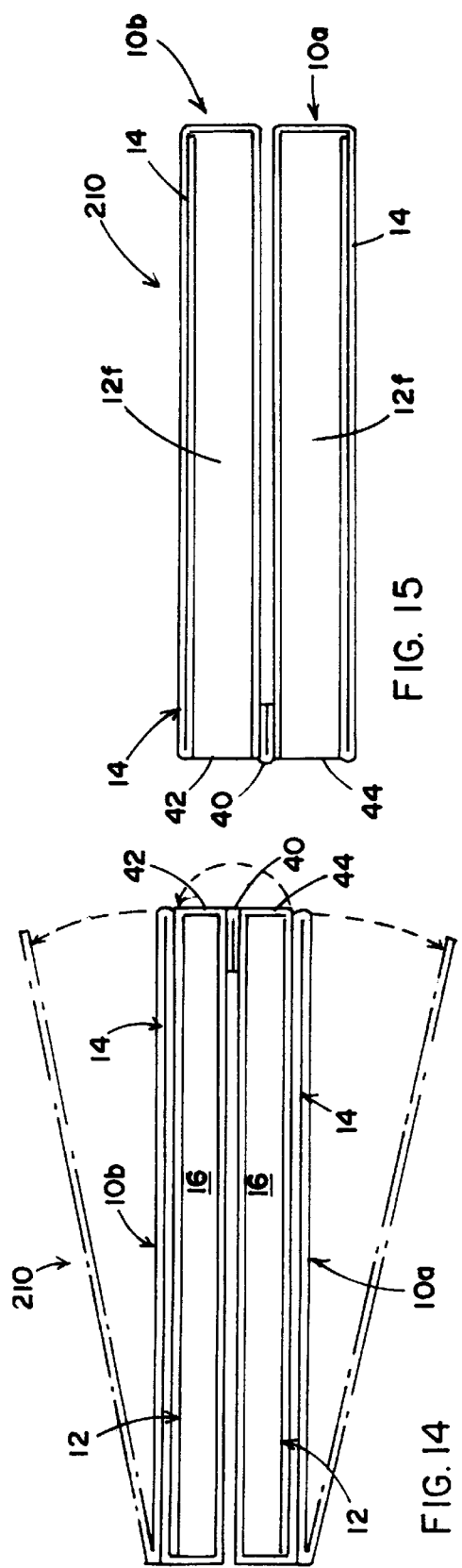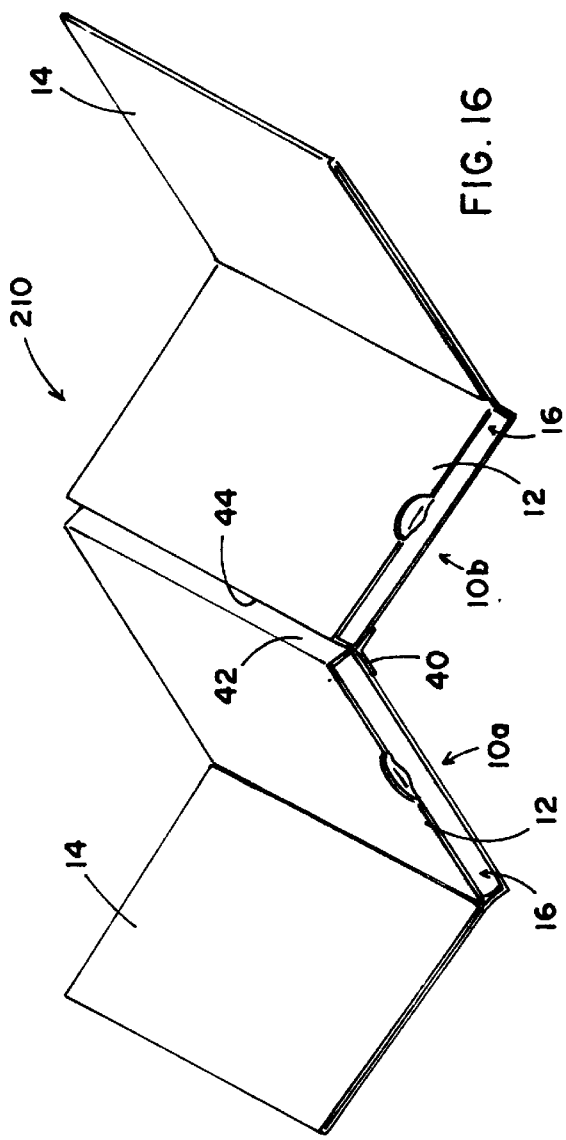

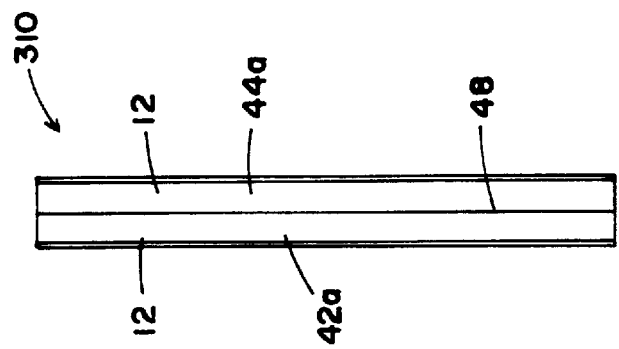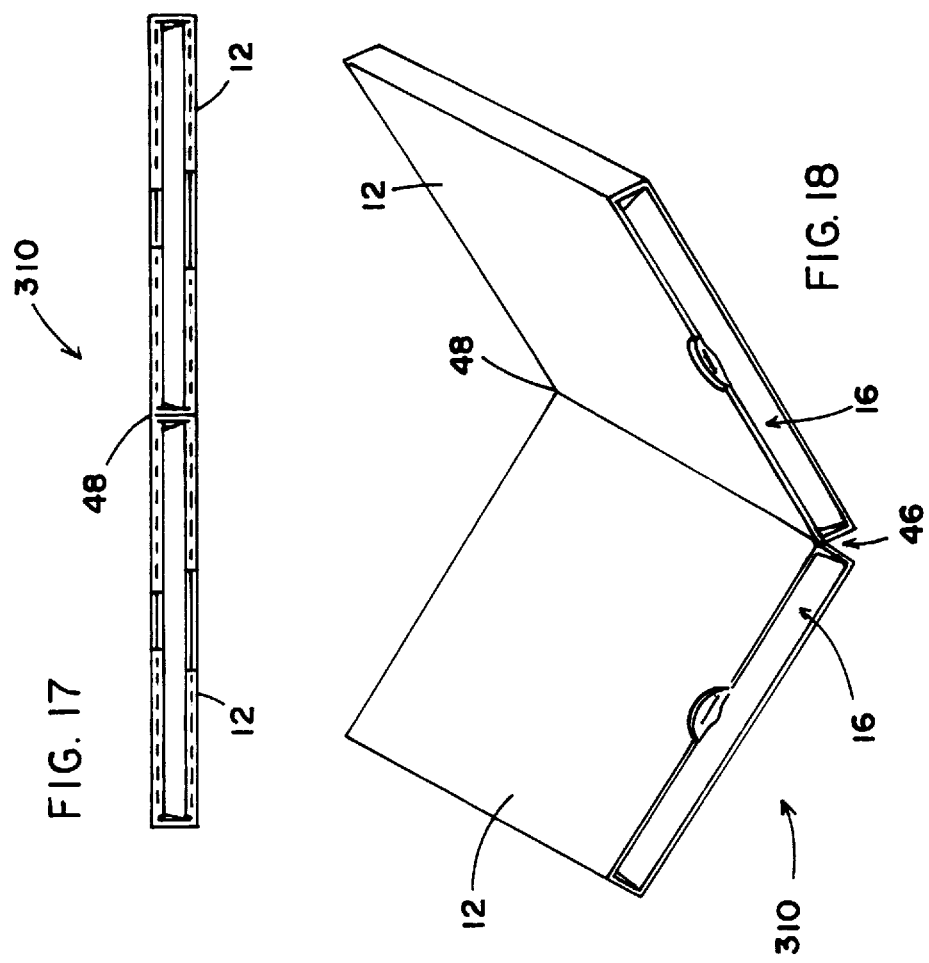

PACKAGING CONTAINER FOR RECORDINGS AND THE LIKE

This application claims benefit of USC Provisional Application No. 60/015,909, filed Apr. 22, 1996.

BACKGROUND

This invention provides a new and very novel packaging concept which is particularly well-suited for use in the packaging of recordings for shipment, display and sale, especially recordings in disc or diskette form, and particularly the machine-readable, optically encoded discs known as "Compact Discs" ("CD's"), or "CD-ROMs." In a broader sense, the invention will readily be seen to have a great many other such uses and applications, including other types of recordings (e.g., tape cassettes, etc.) as well as various other kinds of products, and to possess especially useful and novel characteristics.

As is well-known, Compact Discs are most often packaged in shallow clamshell-type plastic boxes (often referred to as "jewel boxes") which have a base or bottom part that incorporates a holder for receiving and retaining the disc, and low peripheral side walls which provide a receptacle for the disc holder. A cover is pivotally attached to this base member and can be moved between an open and closed position, in which the cover and base typically snap together in one manner or another so as to remain in the closed position until intentionally opened. A variety of other generally or directly similar box-like packages have been proposed and used in the past, with varying degrees of satisfaction. For example, reference is made to U.S. Pat. Nos. 4,327,831, 4,488,645, 4,635,792, 4,709,812, 4,762,225, 4,881,640 and 4,880,875.

The prevailing and most commonly encountered CD package referred to above (i.e., the "jewel box") has a number of disadvantages, even though generally being a useful and practical device. For example, access to the Compact Disc inside the base is rather restricted, and it is often difficult or tedious to remove the disc and to avoid dropping it during the process. Further, the cover is often difficult to open due to the snap-fit interengagement of plastic parts, which must usually be flexed in a direction orthogonal to the cover while pulling on the cover with very limited finger purchase. Further, the package itself affords only minimal room for printed promotional or instructional materials and the like, and it is made almost entirely of plastic, requiring a significant amount of that relatively expensive and ecologically disadvantageous material.

Accordingly, there has long been a need for a package suitable to Compact Discs and other types of recordings that is largely or extensively constructed of lightweight non-plastic material, easy to operate and affords substantial space for printed material. In addition, it is desirable that such a package not inadvertently open to expose the disc or readily separate from the disc holder when the disc holder is withdrawn from the package. Some of these features are shown in the present inventor's earlier U.S. Pat. No. 4,488,644, which shows a cassette-type tape recording disposed in a holder which slidably telescopes into and out of a narrow box-like paperboard jacket having internal flaps which limit the allowable extent of such sliding motion. The subsequent patent to Mahler, U.S. Pat. No. 5,088,599, discloses a similar package for a compact disc which incorporates these same features. In each of those patents, the jacket is constructed from a single-blank of material which forms the flaps which engage protruding shoulders or the like on the record holder. In the Mahler patent, these flaps are contiguous with the top and bottom panels of the jacket, extend the width of the package and are further connected at their center points to the top and bottom panels with an adhesive or the like to prevent contact between the flaps and the disc surface. As best shown in FIG. 5 of this patent, as the disc holder is withdrawn from the jacket, the flaps abut come into contact with a pair of projecting shoulders on the disc holder to retain a sizable portion of the latter within the jacket and prevent the disc from being fully exposed.

Although an improvement over "jewel box" CD packages, such devices contain certain disadvantages. For example, the Mahler patent does not disclose any reliable means to retain the disc holder in its fully inserted position inside the jacket, and also teaches that the jacket must have record carrier-engaging flaps on both its top and bottom panels. In addition, quite a bit of material is needed to construct the retaining flaps and extra steps are required in the manufacturing process in order to further attach the flaps to the top and bottom panels of the package with an adhesive. Further, the disc carrier of the Mahler patent cannot conveniently be completely separated from its jacket for storage or re-use of these components, and in fact cannot be so separated without essentially destroying the jacket when the disc carrier is fully withdrawn from the jacket.

SUMMARY

The present invention provides a new and improved form of package for the foregoing application and numerous others, which contains a base or jacket portion formed from a single blank of material, e.g., paperboard stock, and a record carrier (e.g. , disc holder) slidably disposed within said base portion. The single blank of material is cut to the appropriate dimensions and folded into a box to form the base. In addition, a pair of adjacent retaining flaps, contiguous with the front major panel of the base, are folded inside the base so that one free edge of each flap extends in a direction opposite the direction of downward sliding movement of the record holder. Optionally, a widthwise flap, also constructed from the same blank of material, may be provided contiguous with the back major panel of the base and extending into the base in a direction opposite the direction of outward sliding movement of the record holder.

To maintain positive self-retention of the record holder within the base, the pair of adjacent retaining flaps preferably contain apertures which are positioned and adapted to engage tapered pin-like bosses on the disc holder. To withdraw the record holder from the base, the user must pull with enough force to disengage the bosses on the holder from the apertures in the flaps. The lower flap is adapted to engage a notch-like recess (described below) on the underside of the holder to limit the extent of allowable withdrawal and ensure that the holder does not become separated from the base. When the record holder is fully withdrawn from the base, the disc or other record carried on the holder is fully exposed for convenient removal and use. Importantly, the retention flaps are made with a minimum of material and do not need to be further attached to the upper or lower major panels of the base by adhesive or the like.

Clearly, the present invention overcomes the limitations of the Mahler device. Unlike the Mahler package, the upper flaps of the instant invention do not need to be further attached to the major portions of the base because there is no risk that the flaps will contact and damage the surface of the recording. Furthermore, the present invention overcomes the problem with the Mahler package regarding inadvertent withdrawal of the disc holder. That is, when the holder is fully inserted into the base, apertures in the upper flaps engage bosses on the holder to positively retain the holder in the base until the user pulls with enough force to disengage the bosses from the apertures. Lastly, contrary to the Mahler package in which the user must manipulate the disc to remove it from the package, the instant invention allows the user to easily remove the disc or other record member because it is fully exposed upon withdrawal of the holder from the base portion.

The record holder of the invention is preferably press-formed from a lightweight material and, when used to hold a disc, contains a circular retention means on its top surface to engage the center opening of the disc. In addition, the disc holder contains thumb depressions or finger recesses for easy withdrawal of the disc from the disc holder. The underside of the disc holder is preferably dish-shaped (convenient for printed materials) and thus provides an extensive engagement surface (mentioned above) at the top rearward portion of the disc holder. When the record holder is withdrawn a predetermined distance, this engagement surface is abuttingly contacted by the lower flap to ensure that the holder does not separate from the base. Finally, the holder preferably contains an easy-gripping edge or ridge which is exposed by a notch in the center of the front major panel of the base so the user can easily withdraw the holder.

An alternate embodiment of the present invention includes two base portions (as described above) attached by a contiguous "self-hinged" portion for carrying a pair of recordings in a book-like package. An important feature of this dual product configuration is that the two base portions and the hinged portion used to connect them may be constructed from a single blank of material.

Finally, each embodiment of the invention may contain cover portions contiguous with its base portion(s) and which have a hinged relationship with the base to provide additional space for printed material.

It will become apparent from the above comments and ensuing detailed description that the present invention overcomes the disadvantages of previous packages which are used for record members, especially compact discs, and provides features that enhance the functionality and practicality of such packages. As will be understood, the particular type of "record member" for which this new package is used is largely a matter of choice even though the description principally refers to discs, e.g., Compact Disks. Consequently, the terms "record," "recording," and "disc" are to be understood as embracing essentially any suitable type of recording.

BRIEF DESCRIPTION OF THE DRAWINGS

FIG. 4 is a front plan view of the record holder in a preferred form;

FIG. 5 is a cross-sectional view of the record holder taken along the plan V—V of FIG. 4;

FIG. 6 is a perspective view showing the rear side of the record holder;

FIG. 7 is a bottom end elevational view of the record holder;

FIG. 8 is a cross-sectional view of the package with the record holder therein taken along the plane VIII—VIII of FIG. 1;

FIG. 9 is an exploded and partially broken away bottom perspective view of the package showing the interengagement between the boss on the record holder and the aperture in the tab of the base;

FIG. 10 is a fragmentary cross-sectional side view showing the record holder engaged with the widthwise flap of the base;

FIG. 11 is a front plan view of an open double-recording disc package;

FIG. 12 is a bottom end view of the double-disc package shown in FIG. 11;

FIG. 13 is an end view of the double-disc package (shown closed) of FIG. 11;

FIG. 14 is an end view of the double-disc package of FIG. 11 with phantom lines depicting the outward motion of the covers when opened;

FIG. 15 is an end view of the double-disc package of FIG. 11 (shown closed);

FIG. 16 is a perspective view of the double-disc package shown in FIG. 11, shown in a partially open position;

FIG. 17 is an end elevational view of an alternate embodiment of a double-disc package (shown open);

FIG. 18 is a perspective view of the double-disc package of FIG. 17, shown in a partially open position;

FIG. 19 is a side view of the double-disc package of FIG. 17 (shown closed);

DETAILED DESCRIPTION

Figure 1:
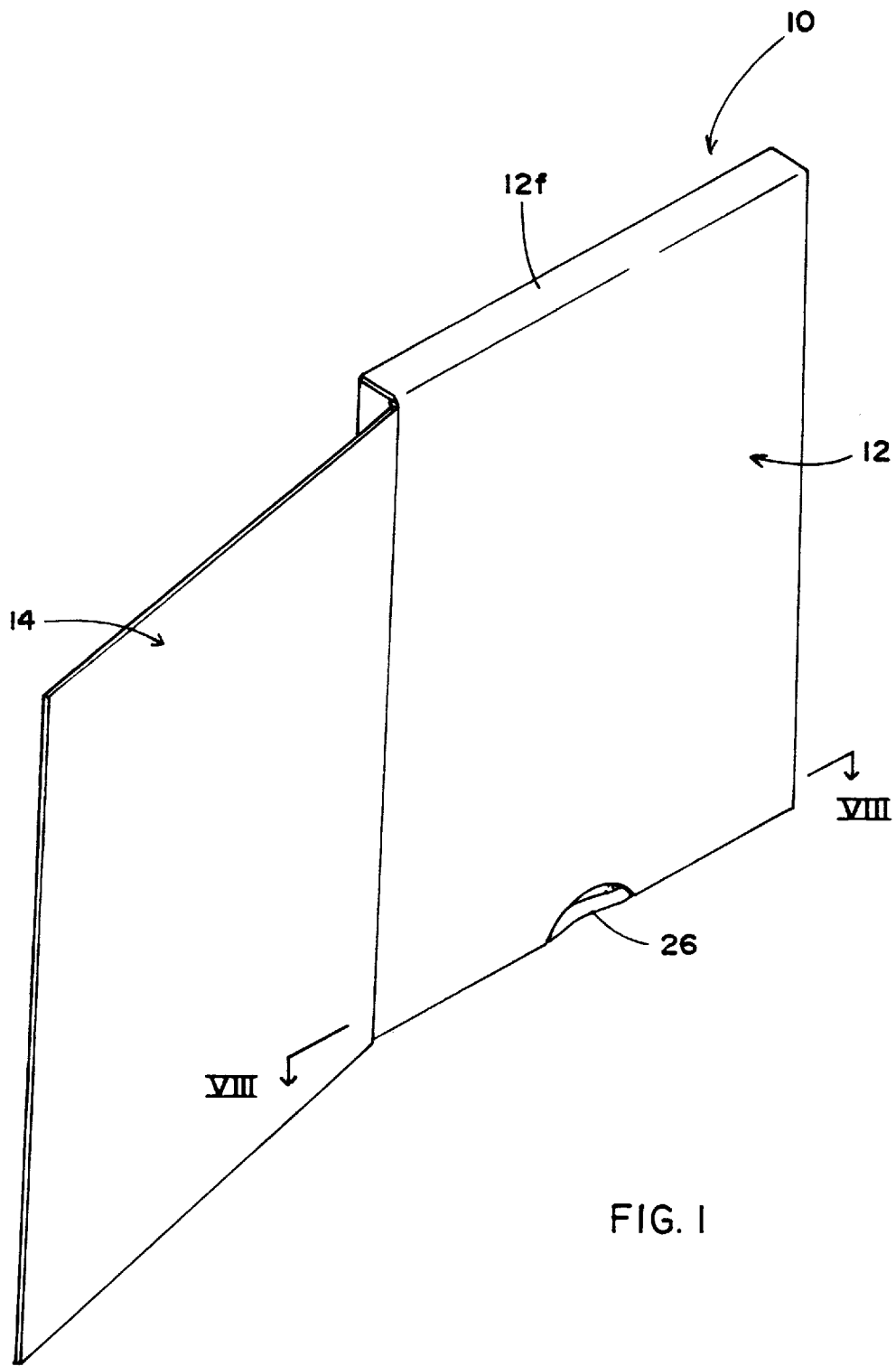
FIG. 1 is a perspective view of the jacket and cover therefor in accordance with the invention.
Figure 2:
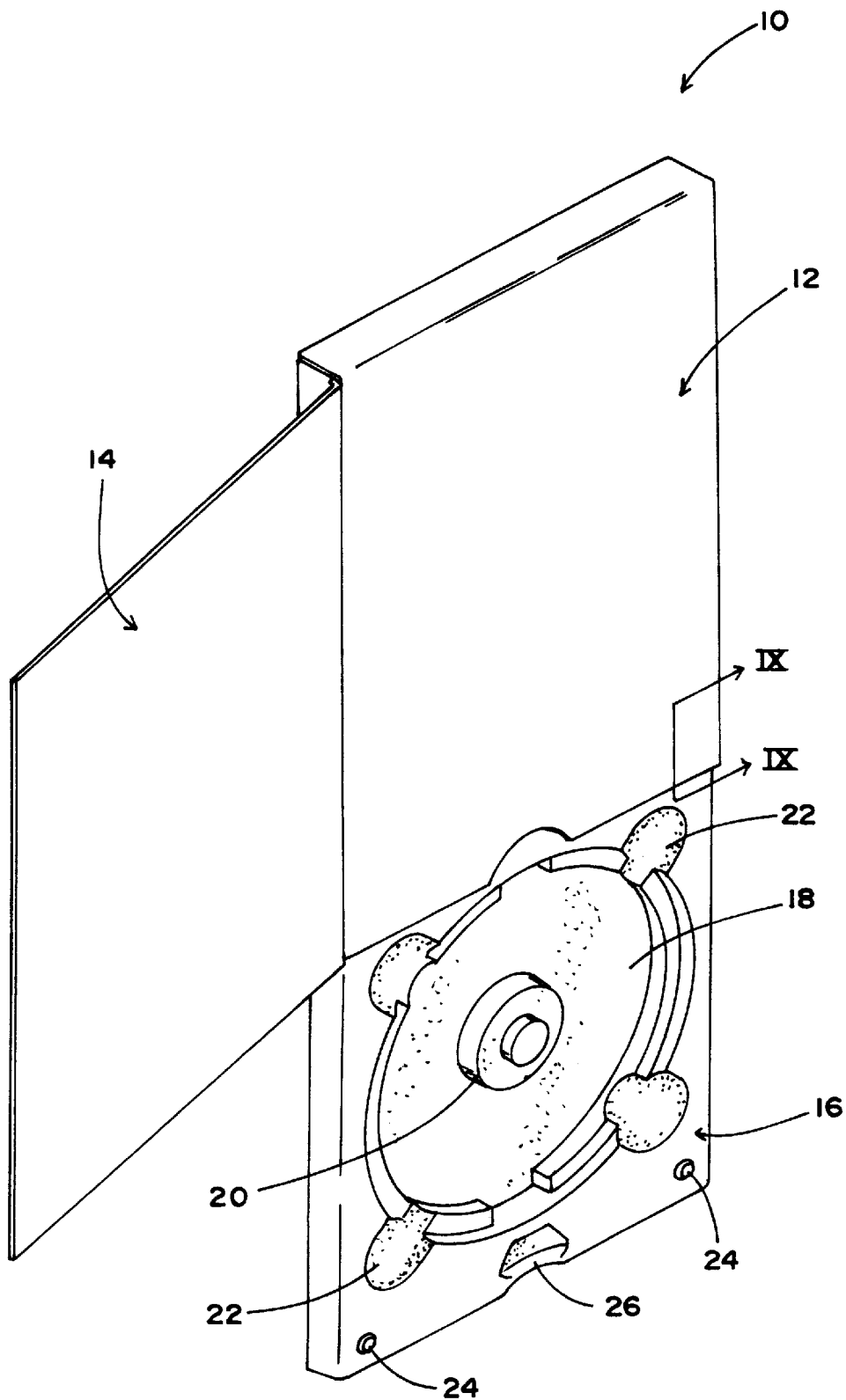
FIG. 2 is a perspective view similar to FIG. 1 but showing the record holder in its fully withdrawn position.
Figure 3:
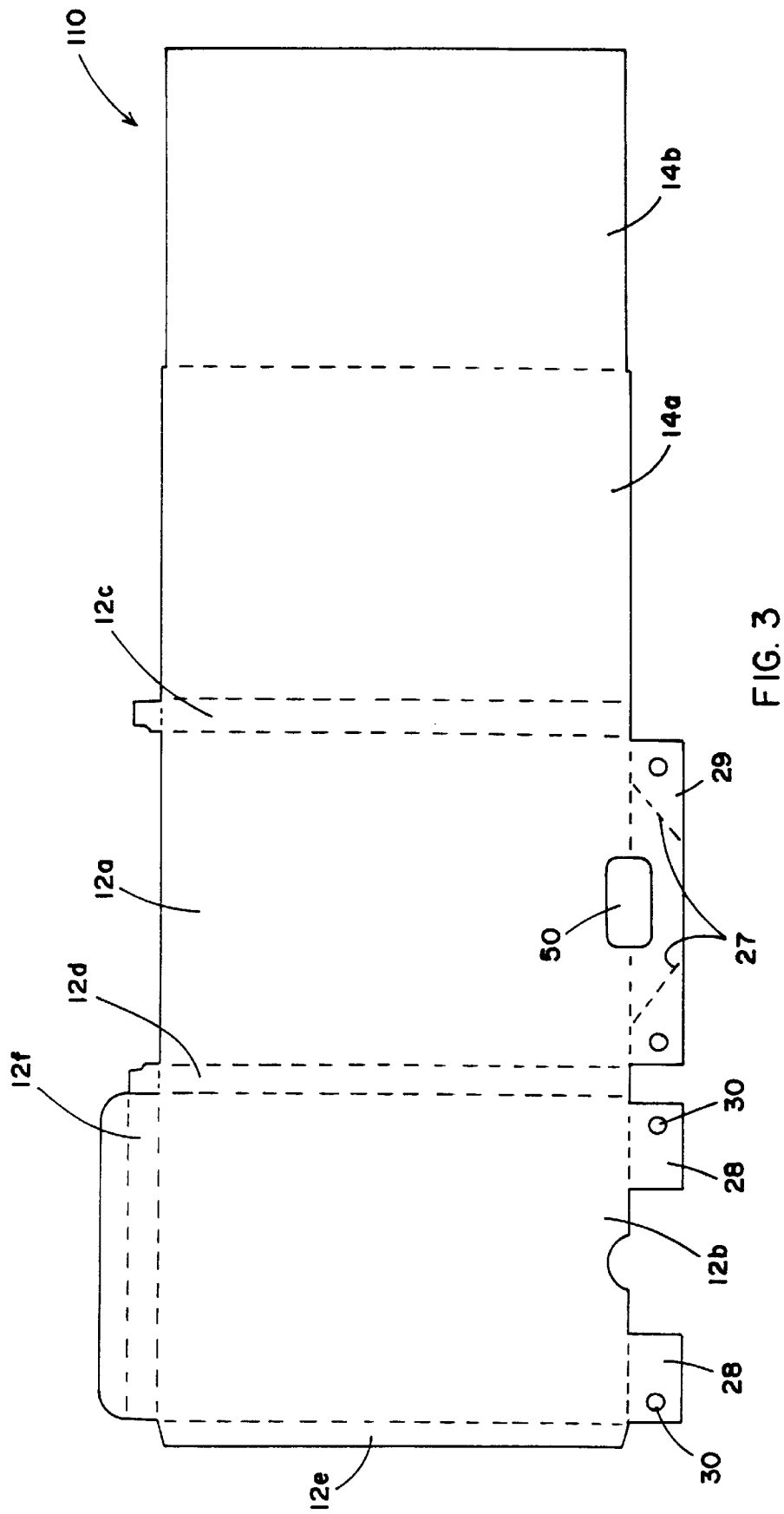
FIG. 3 is a top plan view of the single blank of material used in the construction of the package before it has been folded and assembled.

With reference to FIGS. 1 and 2, a first embodiment of the package 10 includes a base portion 12 having an optional pivotally attached cover or closure 14, both of which can be entirely formed from a single blank of paperboard stock, illustrated in FIG. 3. As will be apparent to those skilled in the art, the blank 110 includes major portions 14a and 14b, which are folded one upon the other and adhered together to form the cover 14, together with major portions 12a and 12b, and minor portions 12c, 12d, 12e, and 12f, which are mutually folded and secured together to form the base 12, which in effect constitutes a narrow, open-ended rectangular paperboard box. Minor portion 12f constitutes a closable end flap, which in general is of a basically conventional nature but which serves a particular purpose in the present case.

As further illustrated in FIGS. 1 and 2, the package 10 includes a holder 16 for a disc or other type of recording, which is slidably disposed within the base portion 12. Where holder 16 is used for discs, it may in a broad sense be similar or analogous to disc holders used in conventional types of CD packaging, including for example a circularly recessed section 18 having a central hub portion 20, which receives and retains the Compact Disc, as well as a series of tapered, groove-like finger-receiving channels 22 by which the Compact Disc may be removed from the hub 20. Whether used for discs or other types of records, holder 16 also preferably has other and non-conventional attributes, however, including indexing and retaining structure, one or more raised pin-like bosses 24, an internal recess 32 and shoulder 34 (discussed further below), and a finger-pull recess 26, on at least the bottom of the disc holder and in some embodiments on the top as well (see FIGS. 4–8 inclusive).

A very advantageous aspect of the invention is the fact that the record holder 16, and a record held thereon, are positively self-retained within the base portion 12 until intentionally withdrawn therefrom, as well as retained positively by the base portion 12 even after having been telescoped outward for access to the record, as generally shown in FIG. 2. While it may be possible to accomplish these purposes in a variety of ways once having read this disclosure, a preferred structure for accomplishing this includes the aforementioned indexing and retaining structure, e.g., pin-like bosses 24, in combination with internal receptacles for these members, which may simply be provided by a desired number of tabs or flaps 28 forming part of the front major portion 12b of base 12 (FIG. 3). In addition, a similar tab or flap 29 extending across the width of the base and formed as part of the back major portion 12a of base 12 (FIG. 3) may be used. These tabs 28, 29 are folded inside the holder receptacle provided by base 12, into the position generally shown in FIGS. 8 and 10. Preferably, the base 12 and its tabs 28, 29 are made from a material which naturally flexes and provides a self-hinge with at least limited resiliency when so bent, to self-bias the flap to the engagement position shown in FIG. 9. If desired, at least the front tabs 28 may have a narrow line or band of resilient adhesive (not shown) along the contiguous portion of each of the tabs and the adjacent front major base portion 12b, so that the tabs 28 will resiliently flex away from the front base portion. The back tab 29 typically will not have such a band of adhesive; rather, it relies on the resiliency of the material to ensure that the tab flexes away from the back major portion 12a, as generally shown in FIG. 10. In addition, the tab incorporates diagonal "score" lines 27 (FIG. 3) which allow the widthwise ends of the tab 29 to further flex away from the back base portion to ensure contact between the tabs 29 and the holder 16 when the holder is withdrawn from the base portion.

As shown in FIG. 3, each of the front tabs 28 has an aperture 30 formed in it, and these are sized to receive the projecting pin-like bosses 24 of the holder 16 when it has been fully inserted inside the base 12, as illustrated in FIG. 8. This interengagement provides a positive retention character of the holder 16 within the base 12, preventing the holder 16 from merely sliding outward due to gravity, or even by random jostling, etc. Thus, the finger-pull recess 26 at the bottom of the record holder 16 is very useful for allowing the user to obtain purchase on the slide to pull it outward with the minor but deliberate amount of effort required to disengage the pins or bosses 24 from their respective apertures 30. In this regard, each of the bosses 24 is preferably tapered (i.e., conical) at least slightly (as shown in FIGS. 5, 7 & 8), and has at least a slightly rounded (radiussed) circular edge between its side walls and flat outer end (best seen in FIG. 5). This facilitates easy and nondestructive engagement and disengagement of the pins 24 with the apertures 30, even though the latter are merely provided in relatively thin paperboard stock, enabling practically innumerable retractions and reinsertions of the slide 16 without physical destruction or degradation of the edges of the apertures 30.

The record holder 16 includes retention means 32 (FIGS. 4, 5, 6, and 10), preferably in the form of a recess which extends into the dish-shaped reverse side of the disc holder along its top (discussed below). As illustrated, the recess 32 extends across the top part of the holder 16, i.e., that portion disposed nearest the back minor portion 12f when the holder is inside the base 12, and it has sides 34 which extend almost orthogonally with respect to the main front surface of the base. Preferably, recess 32 is nearly as deep as the thickness of the holder. As best illustrated in FIG. 9, recess side 34 engages the inside end 35 of the back tab 29 when the holder 16 is withdrawn from the base 12 to the position illustrated in FIG. 2. This provides positive self-retention between the holder and the base 12, which exposes the entire top of a disc or other record member retained in place upon the holder while also insuring that the holder will not accidentally disengage from the base. While the recess 32 is a desirable way of complementing the aforementioned retention means, it should be pointed out that the laterally extending top edge 33 of the preferred dish-shaped disc retainer may itself be used as the wall 34, in which event the recess 32 could be omitted.

Among other aspects of the novel package 10, it should be noted that the reverse side of holder 16, opposite the disc-receiving recess 18, may be recessed deeply away from the body of the holder when that member is formed of relatively solid plastic material, as it may be in one embodiment. Even more preferably, as discussed above, holder 16 may be formed of thin plastic sheet material which is molded or vacuum-formed, etc., into the rectangularly dished configuration illustrated (FIG. 6), in order to minimize the amount of plastic used in it. The circular recessed section 18 and the channel-like recess 32 extend into the space defined by the dished configuration. In some such configurations, it may not be strictly necessary to provide the bosses or pins 24 or the finger recess 26 on both sides of the holder, and those in the bottom or reverse side of it may be omitted. This is particularly true where the slide 16 is made of thin-sheet material in the dished configuration because such an element will be light in weight and require less retention. Also, in such a configuration, a finger recess 26 is not necessary on the reverse side of the holder, particularly because the bottom of the holder has a lower peripheral edge which can readily be engaged by the user through a notch in the base portion 12 on that side.

Another variation of record holder 16, not specifically illustrated, may include a record-receiving recess 18 on both sides, whereby a single holder may hold two record members simultaneously. In such a configuration, the holder may include retention means on both its front and back surfaces preferably in the form of a notch-like recess which extends across at least one side of the holder. Such a recess preferably has a tapered forward edge and a generally right-angled back shoulder. When the holder is withdrawn from the base a predetermined distance, a series of tabs like those designated 28 and 29 in FIG. 3, engage the back shoulder of the retention means to provide positive self-retention between the holder and the base. Of course, both sides of the holder would also have tapered grooves, for ready removal of the record on each side of the holder, particularly when the records are discs.

Another form of a double-record package, designated 210, is illustrated in FIGS. 11–16 inclusive. This will be seen to basically comprise a pair of the packages 10 discussed above, which have been joined together by a flexible hinge section 40, which may be provided by any convenient means (e.g., an adhered overlay of reinforced paper, plastic or sheet fabric, etc.). Accordingly, the double-package 210 in the form shown in FIGS. 11–15 will compactly fold together into the book-like form shown in FIGS. 14, 15 and 16, in which the two adjoined units 10a, 10b lie back-to-back, with their respective outer covers 14 folded to the position shown, and the directly contiguous, inter-connected side surfaces 42, 44 providing a convenient "spine" for carrying title and other such information and displaying the same when the package is placed on a bookshelf or the like with these surfaces facing outward.

An alternate embodiment of the double-package invention is the version 310 shown in FIGS. 17–19, and this is presently contemplated as the preferred commercial embodiment for such a double format since it is simpler than the embodiment of FIGS. 11–16, and uses the preferred single-sided, lightweight dish-shaped record holder which may be made from a single blank. As will be seen from FIG. 19, the double version 310 does not employ the optional outer covers 14, and instead merely comprises a pair of adjacent and adjoined main or base sections 12, having a common boundary panel 46 forming the "spine" of the package and connecting the two halves of the symmetrical blank to be used in forming this configuration. Thus, the integral end panel 46 has a center score 48 which in effect divides it into a pair of coordinated and adjoining end or spine surfaces 42a, 44a and functions as a "living hinge." The embodiment 310 is the simpler, more economical double-format package, and the absence of closure panels 14 is largely offset by the fact that the two main sections 12 hinge toward one another and lie directly adjacent to each other when the package is closed, with each such section covering the inside surface of the other. Of course, each main section 12 can also be used alone, in a single package, as noted above in conjunction with the embodiment of FIGS. 1 and 2.

As will be evident from the foregoing, the package 10 and its various implementations provides many advantages over the various types of conventional packaging presently in use, including significantly improved economy of manufacture and ease of use. Other important advantages may be less evident but are no less important. One of these is the general appearance and impression of substance and quality which the package provides, along with its general quality of being book-like in basic overall appearance (and thus connotative of quality and lasting value with respect to its content), while at the same time having a machine-like slide-drawer quality or characteristic which is generally or implicitly analogous to the manner in which most CD players operate to receive the disc and move it into and out of playing position. In this respect, the positive, self-indexing, two-way locking action provided for the record holder by the package 10 is further appealing and connotative of quality, etc., and thus very appealing from the consumer point of view. At the same time, the package is readily storable upon a shelf or the like and provides a convenient labeling surface for the contents, in the same manner as books on a library shelf; further, the extensive amount of available surface for printing information, advertising, etc., far exceeds that of conventional packaging intended for similar usage. Most or all of these advantages are obtained regardless of whether or not the optional cover 14 is used, although that does enhance the book-like character of the package when used.

In addition, but also of definite importance, is the fact that most of the package 10 (including the entire one-piece blank from which it may be formed) may be made of inexpensive and bio-degradable paper stock, while at the same time the record-carrying slide, while preferably of polymeric material, utilizes the minimum amount of such material in the preferred lightweight dished form. Also, the slide or holder 16 is readily separable from the remainder of the package without any damage to either by opening the top flap 12f and sliding the holder 16 out that end of the base 12 (the flaps 28 and 29 not then being an obstacle), thereby making it possible to separate the two for more convenient and less expensive storage when this is desired (the outer package or base 12 being readily flattened for storage and the preferred, dish-like holders being nestable one within another for minimizing space usage). In addition, this feature of readily separability greatly facilitates the reclamation and reusage ("recycling") of both major parts, with all of the related environmental advantages. That is, recycling of either the polymeric or paper parts is not commercially feasible if they are secured to one another or if they require time and effort to separate. In contrast, other such packaging utilizes considerably more "plastic", and frequently bonds the plastic to paperboard material, making them substantially inseparable and difficult or impossible to recycle. Another desirable aspect of the package 10 is that the preferred paperboard blank forming the base or main section 12 provides for convenient and inexpensive ancillary features; e.g., a perforated tear-out tab 50 may readily be provided in the blank to serve as a proof-of-purchase tag or coupon (as is usually necessary in the retailing of the CDs), while also covering the peripheral edge on the underside of the disc holder.

Of course, it is to be pointed out that numerous variations in particular materials and specific construction techniques may readily be used instead of those noted above in the preferred embodiments presently contemplated, and the record holder may readily be configured into other shapes, etc., so as to accommodate other products, including not only various other record media (diskette, tape, etc.), but various other consumer products as well. Even in the single, most-economical embodiment depicted in FIGS. 2, 4, 5, 6 & 7 the essentially hollow rear side of the record holder 16 may be configured to hold a wide variety of objects or articles, including various printed materials, promotional items, etc. Furthermore, a double-record (e.g., two-disc) slide may be constructed by securing a pair of dished, thin-walled disc holder sections together in back-to-back relation, thereby providing an essentially hollow disc holder having a disc recess and holder on each opposite side.

It is to be pointed out once again that while the foregoing disclosure addresses a particular preferred embodiment, and best mode, the particular apparatus described and the various detailed aspects thereof noted are regarded as pertaining to only the most preferred version of the invention and to merely illustrate the principles and concepts involved in the invention, other embodiments and versions of the invention no doubt being feasible and potentially appropriate in other circumstances. It is therefore to be understood that the foregoing description of a particular preferred embodiment is provided for purposes of description and illustration, and not as a measure of the invention, whose scope is to be defined solely by reference to the ensuing claims. Embodiments of the invention differing from those set forth above which nonetheless utilize the underlying concepts of the invention and incorporate its spirit should therefore be considered as within the scope of the claims appended below, unless such claims by their language specifically state otherwise.

The embodiments of the invention in which an exclusive property or privilege is claimed are defined as follows:

1. A package for releasably storing recordings including compact discs, comprising:

a base portion constructed from a blank of readily disposable stock; and a recording-holder disposed in a telescoping relationship with said base portion;

wherein said base portion comprises a box which has a widthwise open end and which is defined by two parallel major panels, front and back, separated by a distance defined by the thickness of said disc holder and four minor panels which are mutually folded and secured together; and wherein at least one tab contains an aperture and is disposed contiguous with the widthwise edge of said front major panel of said open end of said base and extending into the space enclosed by said base when said base is fully assembled; and wherein said holder includes at least one pin-like boss arranged to engage said aperture when said holder is fully inserted into said base portion.

2. A package for releasably storing recordings according to claim 1, wherein each pin-like boss is adapted to readily engage said aperture in each said tab to prevent lengthwise movement of said holder when said holder is fully inserted into said base portion, each pin-like boss being tapered and conical to insure easy engagement/disengagement between said holder and said base portion.

3. A package for releasably storing recordings according to claim 2, wherein a pair of said tabs are located at either side of said widthwise edge of said front major panel of said base, each tab having at least one said aperture, and said holder including at least one said pin-like boss at each side of the width of its lower front surface, each boss being adapted to readily engage said aperture on that side.

4. A package for releasably storing recordings according to claim 3, wherein a widthwise tab is contiguous with said back major panel at said widthwise open end of said base and extends into the space enclosed by said base when said base is fully assembled, and contains diagonal score lines at its outer ends to lift the outer ends of said tab.

5. A package for releasably storing recordings according to claim 4, wherein said holder is adapted to receive disc-like recordings and has a circular recess, a hub at its center, a series of finger channels surrounding said hub, a widthwise recess situated at the top portion of said holder, and a finger recess at the bottom end of said holder.

6. A package for releasably storing recordings according to claim 4, wherein the underside of said holder is dish-shaped and contains an outer peripheral edge.

7. A package for releasably storing recordings according to claim 6, wherein said widthwise recess extends into said dish-shaped underside of said disc holder.

8. A package for releasably storing recordings according to claim 7, wherein said widthwise recess of said holder engages said widthwise tab attached to said back major panel of said base when said holder is withdrawn a predetermined distance from said base portion.

9. A package for releasably storing recordings according to claim 8, wherein said widthwise tab of said back major panel of said base is adapted to engage said widthwise recess at the top of said holder to preclude said holder from being fully withdrawn from said base.

10. A package for releasably storing recordings according to claim 9, wherein said holder includes a finger recess to withdraw said holder from said base by pulling with sufficient force to disengage said boss on said holder from said aperture in said tab of said base.

11. A package for releasably storing recordings according to claim 1, including a reclosable cover contiguous with one of said minor panels of said base portion.

12. A package for releasably storing recordings according to claim 9, wherein said reclosable cover maintains a hinged relationship with said base portion.

13. A package for releasably storing multiple record members comprising:

first and second base portions;

a pair of record member holders having a top, a bottom, and side wall portions, each such holder disposed in a telescoping relationship with a respective one of said base portions;

a hinged portion connecting said base portions;

each said base portion comprising a box having at least one widthwise open end and defined by spaced and generally parallel front and back panels, said base portions further having minor panels which are mutually folded and secured together with said front and back panel to form said box, and at least one tab having an aperture and disposed generally contiguous with the widthwise edge of said front panel of said open end of each said base portion, said tab extending into the space enclosed by each of said base portions when said base portions are fully assembled.

14. A package for releasably storing record members according to claim 13, including a pair of said tabs, each located at an opposite side of said widthwise edge of said front panel of each of said base portions, each tab having at least one said aperture, and each of said record member holders including at least one pin-like boss at each side of its lower front surface, each said boss being adapted to readily engage said aperture on that side.

15. A package for releasably storing multiple record members according to claim 14, wherein each said pin-like boss of each said holder is arranged to engage said corresponding aperture of each said tab when each said holder is fully inserted into each said base portion.

16. A package for releasably storing multiple record members according to claim 15, wherein each said pin-like boss is adapted to readily engage said aperture in corresponding said tab when each said holder is fully inserted into each said base portion, each said pin-like boss being tapered and conical to insure easy engagement/disengagement between said holder and said base portion.

17. A package for releasably storing recorded members such as compact discs comprising:

a sleeve having a plurality of sidewalls and generally parallel front and back panels;

a record holder disposed in a telescoping relationship within said sleeve;

a first interengaging structure including a projection on said record holder and at least one tab on said sleeve, said tab having an opening for receiving said projection;

a second interengaging structure defined by portions of said record holder and said sleeve;

said first interengaging structure inhibiting inadvertent withdrawal movement of said record holder from said sleeve when fully telescoped therewithin and said second interengaging structure preventing said record holder from separating from said sleeve when said holder is telescoped outwardly from said sleeve for a predetermined distance.

* * * * *